Figure 1:
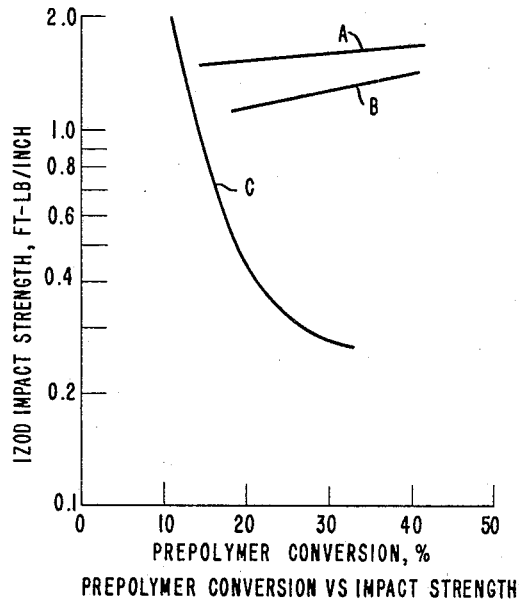

SOURCE OF BUTADIENE UNITS
A- SB 16M/434M
B- SBS (2.5 IV, 21% STYRENE UNITS)
C- 1.9 IV POLYBUTADIENE

PREPOLYMER CONVERSION VS IMPACT STRENGTH

SOURCE OF BUTADIENE UNITS
A- SB 16M/435M
B- SBS (2.5 IV, 21% STYRENE UNITS)
C- 1.9 IV POLYBUTADIENE

PREPOLYMER CONVERSION VS GEL CONTENT

INVENTOR:
LEE M. PORTER

BY: William H. Myers

HIS AGENT

United States Patent Office 3,485,894
Patented Dec. 23, 1969

3,485,894
INTERPOLYMERS OF VINYL ARENES AND CERTAIN BLOCK COPOLYMERS AND PROCESS FOR THEIR PREPARATION
Lee M. Porter, Pleasant Hill, Calif., assignor to Shell Oil Company, New York, N.Y., a corporation of Delaware
Filed Jan. 20, 1964, Ser. No. 338,743
Int. Cl. C08f 36/16, 19/08
U.S. Cl. 260—880  8 Claims This invention relates to new interpolymers of vinylarenes with certain block copolymers. More particularly, it is concerned with the preparation of high impact polystyrene interpolymerized with block copolymers of vinylarenes (e.g., styrene) and conjugated dienes (e.g., butadiene).

Several methods are known for carrying out the polymerization of styrene. One that has enjoyed considerable commercial success is the so-called bulk polymerization or mass polymerization in which the reaction mass consists substantially entirely of styrene which polymerizes under carefully controlled conditions without the addition of polymerization catalysts, or with relatively small amounts of polymerization catalysts, and in the absence of inert solvents. This method can be carried out continuously or by a batch process. Modification of such processes are usually referred to as "dilution processes," wherein only a small amount of a relatively inert diluent is added for viscosity control and reflux temperature control. The process is subject to many modifications, such as carrying it out in a single pot or, more preferably, in a series of reactors the first of which is usually referred to as a "pre-polymerizer."

In the latter process, to which the present invention is especially directed, the first stage consists of a carefully conrolled partial polymerization in which styrene is permitted to polymerize to the extent of from 5–40% of the styrene content of the reaction mixture while the liquid mixture is agitated and its temperature is maintained in the range between 80 and 125° C. This first stage is often referred to as "pre-polymerization." It may be carried out in a single vessel or in several vessels in series. The partially polymerized liquid is then conveyed to another vessel in which the polymerization is completed in liquid phase over a relatively long period of time at progressively higher reaction temperatures between 110 and 225° C. The fully polymerized product is extruded, cooled and may be further treated.

It is also known that the properties of polystyrene, particularly its impact strength and other related properties, can be improved by incorporating an unvulcanized rubbery material in the polymerization mass. While the interpolymerization of rubbery polymers such as polybutadiene with styrene produce improved impact strength, a number of apparent disadvantages limit the widespread use of such processes. For example, it is usually desirable to carry the pre-polymerization as far as possible, while maintaining a relatively fluid product, before raising the temperature and/or passing the pre-polymer to the finishing reactor. This is to prevent an excess heat load in the finishing reactor and also to promote proper molecular weight distribution. However, when the pre-polymerization is carried out in the presence of the usual homopolymers of conjugated dienes such as polybutadiene, it has been found that pre-polymerization is limited to only about 10% of the styrene conversion since if pre-polymerization is carried beyond this point, the impact strength of the product drops disastrously and the percent of desirable gel also drops drastically. Consequently, the use of such homopolymers is seriously limited by these and other undesirable results obtained when using such homopolymers for alteration of the impact strength of the final product.

It is an object of the present invention to improve the properties of high impact poly(vinylarenes). It is another object of the invention to improve the high impact properties of polystyrene. It is a particular object of the invention to provide an improved process for the production of high impact interpolymers of polystyrene. Other objects will become apparent during the following detailed description of the invention.

Now, in accordance with the present invention, improved high impact interpolymers are provided comprising 99–80 parts by weight of a vinylarene and from about 1–20 parts by weight of certain block copolymers as more fully defined hereafter. Still in accordance with the present invention, a method for interpolymerization is provided comprising heating a mixture of a vinylarene and block copolymer at a temperature below about 125° C. until about 10–40% of the vinylarene is polymerized and thereafter completing the interpolymerization at temperatures between about 110° C and 225° C. In one special aspect of the invention, improved high impact polymers are provided comprising a major proportion of vinylarene units interpolymerized with both the block polymers and a conjugated diene homopolymer or a random copolymer of a conjugated diene and styrene.

The interpolymerization of vinyl arenes with the block copolymers described hereinafter enables the pre-polymerization to be carried to a much further extent than is possible with diene polymers utilized for this purpose heretofore. It has been found that the impact strength and gel content of the interpolymers are substantially greater than when styrene or other vinyl arene is interpolymerized with a diene homopolymer or random copolymer thereof with styrene. The basic factors responsible for this improvement are not entirely clear at this time, but the data given hereinafter in the examples will demonstrate the results obtained.

Another important advantage attainable through use of block copolymers is the ability to attain very high glass in combination with excellent impact resistance. As an indication of this benefit, products in Table V made with SBS copolymers exhibit uniform dispersions of the rubbery phase in particular having a 10-fold smaller diameter than can be obtained at equivalent impact strength (and necessarily low prepolymer conversion) when an equal amount of butadiene units is incorporated in the form of polybutadiene homopolymer. It is well known that decreasing the size of dispersed particles improves surface gloss. Superiority in terms of glass over products made with conventional SBR rubber is even more striking. Significant benefits in gloss imparted by use of block copolymers can be seen also by a comparison of direct measurements provided in Table I.

Low temperature impact resistance properties are yet another property in which products based on block copolymers excel. In comparison to products made with conventional SBR rubbers, the superior low temperature behavior can be attributed largely to the lower temperature of mechanical damping maxima. Products based on block copolymers have mechanical loss peaks, as measured by a torsional pendulum, ranging from −70° to −80° C. whereas products based on SBR have loss peaks around only −45° C. Products based on polybutadiene homopolymer have loss peaks extending to even a lower temperature −83° C. for example, and here the superiority of block copolymer-based products must be attributed to the same factors that impart superiority at ordinary temperatures. A comparison of low temperature impact resistance properties is provided in the form of Izod measurements at 0° F. listed in Table I given hereinafter.

While the block copolymers to be utilized in the present invention may have from two to 40 alternating vinylarene and diene polymer blocks, the preferred copolymers have the general configuration.

wherein A is a polymer block of a vinylarene, B is a polymer block of a conjugated diene and C is either a polymer block of a vinylarene or a monomeric polymer terminating radical such as hydrogen, methyl, methoxyl, hydroxyl, carboxyl, carbonyl, sulfhydryl, etc. Thus, the two generally preferred types of block copolymers considered here may be said to be either 3-block copolymers or 2-block copolymers.

The vinylarenes utilized in the preparation of these copolymers are typified by styrene but may be substituted styrenes such as alpha methyl styrene, ring methylated styrenes or vinyl naphthalenes. The conjugated dienes utilized in the formation of the polymer block B preferably have from 4–8 carbon atoms per molecule of which butadiene and isoprene are typical and preferred.

The methods by which these block copolymers are formed do not comprise an essential part of the present invention. Briefly, however, they usually are formed in their most desired molecular weight range by the use of alkali metal-containing organo catalysts capable of forming "living polymers," the several types of monomers being injected into the system in succession. Thus, when utilizing lithium based catalysts such as alkyl lithiums, it is preferred to form the first polymer block A by the use of styrene; allowing substantially all of the styrene to block polymerize and form a living polymer block, after which a conjugated diene such as butadiene is injected into the system; continuing polymerization to form the polymer block B thereof; and either terminating the block by the addition of methanol, water, oxygen, or the like, or then injecting a further quantity of vinylarene to form polymer block C.

Block copolymers of more intricate structure are obtained by continuing the polymerization with alternating introduction of the two types of monomers to form successive blocks

having an average molecular weight between about 65,000 and about 750,000.

In order to be most effective for the formation of the subject interpolymers, the blocks A should have average molecular weights between about 5,000 and 60,000, while the conjugated diene block B should have an average molecular weight between about 60,000 and 500,000. The most effective block copolymers should have between 2 and about 40% by weight of vinylarene polymer blocks and the intrinsic viscosity measured in toluene at room temperature should be between about 1 and 5.

A special type of block copolymer is provided for use in these interpolymerization wherein at least 75% of the diene linkages are hydrogenated but no more than 25% of the vinylarene portions of the block polymer are hydrogenated. Such block polymers are exceptionally stable to heat and oxidation (because of the reduction of diene linkages) but are still slightly compatible with the main component of the interpolymer namely the vinylarene, since the vinylarene polymer blocks are reduced only to a minor extent.

The interpolymers of the present invention may comprise as a major component, condensed units of vinylarenes such as styrene, which is preferred, as well as alkyl-substituted styrenes including alpha-methyl styrene and ring substituted alkylated styrenes. The interpolymers may comprise either a two-component composition of the above-described block copolymers and the vinylarenes or three-component interpolymers wherein the third component is an elastomeric conjugated diene which may be either a homopolymer or random copolymer of styrene and conjugated diene, such as styrene-butadiene. The block polymers and the optional conjugated diene polymer are present in an amount of 1–15% by weight each, based on the total interpolymer. Preferably the total amount of block polymer and/or block polymer plus elastomeric diene polymer is between about 5 and 25% by weight of the total interpolymer.

Bulk polymerization processes for the preparation of polystyrene have enjoyed substantial commercial success particularly where the second polymerization stage comprises a vertical tower in which the polymerization mass moves from top to bottom. The tower consists of several zones or sections, each of which contains heat controlling means. In the upper most stage of the tower, heat control may be entirely by evaporate cooling, resulting from boiling off of styrene or of any added diluent (such as toluene) from the prepolymerized liquid entering at the top of the tower. In the remaining sections, and also in the top section if desired, there are provided indirect heat exchange means, such as jacketing and internal coils.

Although the two-stage polymerization such as that described has advantages over other commercial methods of operation, it nevertheless has certain undesirable limitations. These limitations are largely associated with the difficulty of maintaining the desired temperature levels in the reactor. The amount of heat liberated during polymerization of styrene is very substantial. Most of the heat is separated in the uppermost section of the tower and results in boiling off of styrene. Therefore, if it is necessary to maintain a low level of conversion in the pre-polymerizer, prior to the tower reactor, the latter necessarily bears an excessive heat load which requires a large recycle of condensed styrene vapors or a substantial removal of heat by heat exchange means. Moreover, if the pre-polymerizer does not permit the sufficient degree of conversion prior to passage of the mixture to the reactor, the proper balance of molecular weight species is not attained and the physical properties of the product correspondingly suffer.

When utilizing butadiene homopolymer as the high impact component in an interpolymerization with styrene, it has been found that the extent of pre-polymerization before passage of the reaction mixture to the main tower reactor is strictly limited. If conversion is carried beyond about 10–12% of the original styrene monomer, the impact strength of the resulting interpolymer is drastically reduced. Consequently, the process heretofore practiced has been limited in this resepct. In accordance with the present invention, however, it has been found that the presence of the block copolymers described above permits pre-polymerization to proceed to a substantially greater extent. Consequently, the product not only has the desired high impact properties and high gel content, but also permits a pre-polymerized product to pass through the tower reactor without causing an excessive heat load therein.

The preferred method of practicing the invention comprises introducing a solution of the subject block copolymers described hereinbefore and dry styrene to the top of a pre-polymerization vessel, the process being carried out continuously. The rate of introduction is such as to keep the vessel full of liquid or to maintain a constant liquid volume therein. If any space remains over the liquid in the pre-polymerizer, it should be free from air and oxygen but may be filled with styrene vapor or with an inert gas such as nitrogen, methane, or the like. Preferably, however, the pre-polymerization vessel is kept full of styrene and other interpolymerizing components and free from gas.

The pre-polymerization vessel can be at atmospheric pressure, or it may be operated under a small positive pressure to prevent contamination of the product with lubricant or other material which might be extracted from the stuffing glands of the stirrer, or nitrogen gas may be bled through the stuffing glands of the stirrer to prevent contamination.

The polymerization temperature of the liquid in the pre-polymerizer is maintained at a desired level, generally in the range between about 80° and 125° C., still more preferably between about 95° and 115° C., by withdrawing heat from or supplying heat to the liquid body through the walls of the vessel or by suitable heat exchanger within the body of the liquid.

The total contents of the pre-polymerizer are slowly stirred by means of a suitable stirrer such as a paddle. The rate of passage of the interpolymerizing mixture through the pre-polymerization vessel is controlled to effect a fixed amount of polymerization between about 5 and 40% of the introduced monomer. The preferred degree of conversion is between 15 and 30%. The residence time in the pre-polymerization zone is generally from about 8 to 20 hours. With catalysts, a shorter residence time can be used. Although a single vessel may constitute the pre-polymerizer, it is understood that pre-polymerization may be carried out in two or more vessels in series or other similar arrangements.

The partially polymerized liquid leaves the pre-polymerizer by gravity or under slight applied pressure or by pumping and passes through the polymerization tower. Since the viscosity of the liquid at a given temperature is an indication of the degree of polymerization, the stream passing from the pre-polymerizer to the polymerization tower may be tested continuously or intermiantly for viscosity and any change in the degree of polymerization which is observed may be corrected by making suitable corrections in the temperature conditions or residence time in the polymerizer.

When the system is in continuous operation, the polymerizing tower contains a liquid body of material which at the top of the tower consists of polystyrene interpolymerized with the block copolymer together with a substantial amount of styrene monomer and at the bottom of the tower consists of substantially completely polymerized interpolymer.

Temperatures of heat exchange means in the tower are desirably controlled in such a manner that at each level of the tower, the temperature is sufficiently high to maintain the material therein in a liquid condition but without letting excessively high temperatures prevail. Suitable temperatures of the jackets and heating coils are for example 100–110° in the topmost jacket and in the next lower jacket, and progressively higher as the polymerizing mixture decends through the tower. Although the heat exchange means in the topmost section of the tower is maintained only at a temperature of 100–110° C., the heat of the polymerization reaction is such that the temperature in this section reaches the point at which styrene boils out of the mixture, the boiling point of styrene being 146° C. During operation, styrene vapors leave the top of the reactor and are condensed and returned to the tower or back to the pre-polymerizer.

The function of the block copolymers in the process just described is that of permitting a sufficient degree of pre-polymerization in the mixture to have occured so that the polymerization requirement in the tower is reduced to such an extent that temperature control is readily effected. In addition to this, the product eventually obtained has improved physical properties as will be shown in the examples to follow.

The polymerization continues as the total liquid mass slowly moves down through the reactor. In the lower sections of the reactor, the polymerization is completed so that the product leaving the bottom of the reactor contains no more than about 10% of unpolymerized styrene and preferably less than about 5%. The material leaving the bottom of the reactor is a viscous liquid which is passed through a suitably heated extruder in which it is devolatilized if necessary and extruded as strands which are solidified by being cooled at atmospheric temperatures. The solid polystyrene interpolymer then is chopped into nibs of suitable sizes for various end uses.

The polymerization may be carried out in the presence of small amounts of compounds which are known to the art to be useful in such polymerizations. For example, there may be present 0.01–1% by weight of a polymerization catalyst such as benzoyl peroxide or ditertiary butyl peroxide. However, catalysts are usually not employed in this interpolymerization process. Low concentrations of lubricants or flow agents such as mineral oils in the 100–500 SSU viscosity range, microcrystalline wax, paraffin wax, butyl stearate, soaps or vegetable oils may be incorporated in the solution at any stage in concentrations up to about 10% by weight of the total mixture. Polymerization modifiers such as lauryl mercaptan may be added to the reaction mass. Oxidation stabilizers such as phenols and phosphites may also be incorporated.

It is of course possible to provide a process of interpolymerization incorporating other alternatives, such as conducting the entire process in a single reactor with appripriate changes in temperatures as the polymerization procedes. Moreover, the block copolymer and/or any homopolymeric rubber or random copolymeric rubber may be added in staged schedules either into the pre-polymerizer or into the tower reactor following it. Supplemental rubbers of either block, homopolymer or random copolymer varieties may be injected into the system after the polymerization has been completed but this would be supplementing the necessary presence of the block copolymer incorporated during prepolymerization.

While bulk polymerization for processes involving only miner amounts of solvent are primarily desired, it is also possible to utilize so-called solvent processes wherein solvent is present in a major proportion relative to the interpolymerizing components. One variation on this type of process comprises first forming the block copolymer in a solvent and thereafter adding to the cement so formed (after killing the catalyst) sufficient styrene monomer to form the preferred ratios of block polymer to monomer referred to hereinabove and thereafter effecting interpolymerization of the mixture so formed. Low temperature properties of the products may be improved by the incorporation of less than about 10% by weight of the interpolymer of a relatively low molecular weight rubber, preferably a conjugated diene homopolymer such as polyisoprene or polybutadiene. This not only improves low temperature properties but also improves the processability and extrudability of the resulting products.

The following examples illustrate several aspects of the present invention:

EXAMPLE I

High impact polystyrene interpolymers were prepared the conditions of experiment being 25% conversion at 102° C. as the pre-polymerization step, the interpolymerization mixture containing 7.5 phr. of toluene diluent. Following pre-polymerization, the polymerization was completed at a temperature beginning at 150° C. and ending at 200° C. Some of the samples prepared contained a mineral lubricating oil in the amounts indicated in Table I. This table also shows the properties of the products obtained.

TABLE I

| | Block Polymer/Homopolymer Mixtures | | Block Polymers | | Homopoly-butadiene | Random Copolymer SBR |
|---|---|---|---|---|---|---|
| Rubber, phr | 6 polybutadiene 2 SB c (20/58) a | 6 polybutadiene b 2 SB c (20/53) a | 10 SBS b (19/235/20) a | 10 SBS b (15/78/18) a | 7 polybutadiene | 7 |
| Mineral lubricating oil, phr | 0 | 2.5 | 0 | 0 | 4.0 | 4.0 |
| Properties (Sheet, 115 mil, 410° F.): | | | | | | |
| Falling wt. impact | 340-390 | 288 | 320-390 | 360 | 250 | 240 |
| Gloss | | 87 | 95 | 85 | 80 | 60 |
| Izod impact, 73° F | 1.50 | 1.44 | 1.72 | 1.79 | 0.86 | .90 |
| Izod impact, 0° F | 1.06 | 0.99 | 1.0 | | 0.70 | .5 |
| Tensile, yield, p.s.i | 3,650 | 3,300 | 4,180 | 3,950 | 2,930 | 4,250 |
| Elongation, percent | 32 | 10 | 6 | 21 | 33 | 34 |
| Heat dist., temp. ° F | 181 | 175 | 176 | 176 | 168 | 179 |
| Dilute solution viscosity, dl./g | 0.70 | 0.74 | 0-67 | 0.67 | 0.63 | 0.78 |
| Gel content, percent wt | 19.4 | 13.6 | 22.0 | 17.6 | 16 | 15 |
| Swell index | 7.9 | 9.4 | 8.6 | 11.4 | 9.5 | 10.0 | a Segmental mol weights in thousands. S=polystyrene block, B=polybutadiene block.
b Polystyrene-polybutadiene-polystyrene block copolymer.
c Polystyrene-polybutadiene block copolymer.

It will be noted from the data contained in Table I that the addition of the block copolymer of styrene and butadiene achieved a substantial improvement in impact strength over that realized when the rubber components consisted entirely of polybutadiene or SBR (random styrene-butadiene copolymer).

EXAMPLE II

Further comparative examples of high impact interploymers were prepared, the conditions in this case being a stirred pre-polymerization at 100° C. to the desired degree of conversion, the reaction time being approximately 16 hours. Stirring was then discontinued and the temperature raised in the course of about 30 minutes to 145° C. at which it was held for three hours and then raised again to 180° C. for 16 hours. Table II presents comparative data obtained under these conditions.

TABLE II

| | SBS a | SB b | 1.9 I.V. Polybutadiene |
|---|---|---|---|
| 13.8/82.5/13/8 c | 13.8/82.5/13.8 | c 16/434 | |
| Rubber loading, percent | 8.4 | 6 | 7 |
| Melt index G | 2.8 | 2.3 | 4.0 |
| Pre-polymer conv., percent | 26.2 | 18.8 | 23.0 |
| Gel, percent | 21.6 | 16.4 | 12.6 |
| Gel, swell index | 14.1 | 12.6 | 12.6 |
| Rockwell M | 19 | 17 | 37 |
| Izod impact strength | 1.6 | 1.2 | 0.27 | a Polystyrene-polybutadiene-polystyrene block polymer.
b Polystyrene-polybutadiene block polymer.
c Block molecular weights in thousands.

EXAMPLE III

Further high impact polystyrene interpolymers were prepared utilizing a block polymer having the structure indicated in the footnotes to Table III. These products also contained 3.5 parts by weight of a mineral lubricating oil. The conditions of preparation were substantially the same as those described for the preparations in Example II.

TABLE III

| | SBS a | SBS a | 2.3 I.V. Polybutadiene |
|---|---|---|---|
| Rubber loading, percent | 10 | 10 | 10 |
| Pre-polymer conv., percent | 22.1 | 28.2 | 28.5 |
| Gel, percent | 20.8 | 19.3 | 18.6 |
| Swell index | 10.4 | 11.9 | 10.5 |
| Melt index G, g./10 min. at 200° C | | 2.7 | |
| Rockwell M hardness | 7 | 11 | 19 |
| Izod impact, ft.-lb./in. notch | 1.7 | 1.3 | 0.8 |
| Tensile impact, ft.-lb./in.² | 61 | 70 | 39 | a 19,000/236,000/27,500 mol weight polystyrene-polybutadiene-polystyrene.

EXAMPLE IV

The effect of block copolymer upon the properties of high impact polystyrene interpolymers is illustrated by Table IV below, wherein the interpolymers were prepared either from styrene in combination with polybutadiene or with the block copolymer described in the table, or on the other hand, with various combinations of these two minor components. The conditions of interpolymerization were substantially those described in Example II above.

TABLE IV

| Sample | S-B a | 1.9 I.V. Polybutadiene | Pre-polymer conv., percent | Gel, percent | Swell Index | Izod Impact, ft.-lb./in. |
|---|---|---|---|---|---|---|
| A | 0.0 | 7.0 | 23 | 12.6 | 12.6 | 0.27 |
| B | 1.0 | 6.0 | 23 | 12.8 | 11.9 | 0.45 |
| C | 2.0 | 5.0 | 19 | 15.8 | 11.1 | 0.81 |
| D | 3.5 | 3.5 | 21 | 17.8 | 11.2 | 1.1 |
| E | 7.0 | 0.0 | 21 | 21.5 | 10.7 | 1.4 | a Polystyrene-polybutadiene block copolymer, 16,000-434,000 mol wt.

EXAMPLE V

Three types of interpolymers were prepared under the conditions described in Example II, one sample containing as the rubber component polybutadiene while the rubber component in the second sample was a block copolymer having the structure polystyrene-polybutadiene the block molecular weight in thousands being 16/434. The third set of samples was made from styrene interpolymerized with a polystyrene-polybutadiene-polystyrene block copolymer. Pre-polymerization was varied as shown in FIGURE 1 and the impact strength of the resulting interpolymers after completion of polymerization was tested. FIGURE 1 demonstrates the advantages gained relative to the permissible extent of pre-polymerization as measured by the impact strength of the resulting polymers. FIGURE 1 shows that when the rubbery component is a conjugated diene homopolymer, the impact strength of the interpolymer drops disastrously as pre-polymerization is carried beyond about 15%. On the other hand, this figure shows that the use of the block copolymer as the rubbery components permits pre-polymerization to be conducted at least as far as 40% without any material effect upon the high impact strength of the resulting interpolymers.

Figure 2:
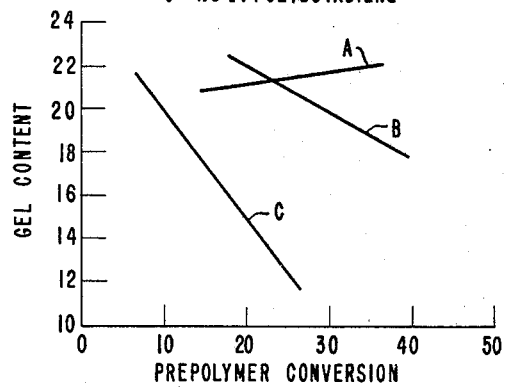

Since gel content has a signfiicant bearing on high impact quality in such interpolymers, FIGURE 2 is included to demonstrate the difference in gel content obtained at various pre-polymer conversions when using the two above-described rubbery components. The same sharp differentation will be noted in FIGURE 2 as was described with reference to FIGURE 1, the block copolymers retaining a high gel content regardless of the extent of pre-polymerization, while the gel content of the comparative sample containing only the polybutadiene homopolymer sharply decreases in gel content with increasing pre-polymerization conversion.

The flat response of impact properties toward prepolymer conversion, obtained through use of block copolymers, provides an obvious advantage in process control. In contrast to results with pure polybutadiene, the use of block copolymers allow drastic changes in properties with minor variations in pre-polymer conversion to be completely avoided.

EXAMPLE VI

Additional high impact interpolymers were prepared utilizing the conditions described in Example II, the block molecular weights of the block copolymers employed being varied to determine their relative effects. The degree of pre-polymerization was also varied. Table V presents data obtained relative to the impact strength of the resulting interpolymer.

TABLE V

| Block Polymer, mol. wt.×10³ | Block Polymer, percent | Pre-polymerization, percent | Izod Impact, ft.-lb./in. |
|---|---|---|---|
| 13.8/82.5/13.8 SBS | 10.5 | 14.7 | 1.7 |
| 13.8/82.5/13.8 SBS | 10.5 | 17.5 | 1.7 |
| 13.8/82.5/13.8 SBS | 10.5 | 26.2 | 1.6 |
| 16/434 SB | 8.4 | 13.0 | 1.5 |
| 16/434 SB | 8.4 | 22.0 | 1.5 |
| 16/434 SB | 8.4 | 38.2 | 1.6 |
| 13-95-16 SBS | 10.0 | 22.0 | 2.0 |

I claim as my invention:

1. A solid thermoplastic interpolymer of from about 99 to 80 parts by weight of condensed mono vinylarene units and from about 1 to 20 parts by weight of a block copolymer having the general formula

A—B—C wherein A is a poly (monovinylarene) block having an average molecular weight between about 5,000 and about 60,000, B is a poly(conjugated diene) block having an average molecular weight between about 60,000 and about 500,000 and C is selected from the group consisting of a monomeric polymer-terminating radical of the group consisting of hydrogen, hydroxyl, alkyl, oxylakyl, carboxyl, carbonyl and sulfhydroxyl and poly (monovinylarene) block having an average molecular weight between about 5,000 and about 60,000 wherein from 2 to 40% by weight of said block copolymer is poly(monovinylarene).

2. A solid thermoplastic interpolymer of from about 98-70% by weight of condensed monovinylarene units and 1-15% by weight each of an elastomeric conjugated diene polymer and of a block copolymer having the general formula

A—B—C wherein A is a poly (monovinylarene) block having an average molecular weight between about 5,000 and about 60,000, B is a poly(conjugated diene) block having an average molecular weight between about 60,000 and about 500,000 and C is selected from the group consisting of poly (monovinylarene) block having an average molecular weight between about 5,000 and about 60,000 and a monomeric polymer-terminating radical of the group consisting of hydrogen, hydroxyl, alkyl, oxyalkyl, carboxyl, carbonyl and sulfhydroxyl wherein from 2 to 40% by weight of said block copolymer is poly (monovinylarene).

3. A solid thermoplastic interpolymer of from about 98-70% by weight of condensed monovinylarene units and 1-15% by weight each of an elastomeric styrene-conjugated diene random copolymer and of a block copolymer having the general formula

A—B—C wherein A is a poly (monovinylarene) block having an average molecular weight between about 5,000 and about 60,000, B is a poly(conjugated diene) block having an average molecular weight between about 60,000 and about 500,000 and C is selected from the group consisting of poly (monovinylarene) block having an average molecular weight between about 5,000 and about 60,000 and a monomeric polymer-terminating radical of the group consisting of hydrogen, hydroxyl, alkyl, oxyalkyl, carboxyl, carbonyl and sulfhydroxyl wherein from 2 to 40% by weight of said block copolymer is poly(monovinylarene).

4. In a method of interpolymerizing 99 to 80 parts by weight of a monovinylarene and from about 1 to 20 parts by weight of a block copolymer having the general formula

A—B—C wherein A is a poly (monovinylarene) block having an average molecular weight between about 5,000 and about 60,000, B is a poly(conjugated diene) block having an average molecular weight between about 60,000 and about 500,000 and C is selected from the group consisting of poly (monovinylarene) block having an average molecular weight between about 5,000 and about 60,000 and a monomeric polymer-terminating radical of the group consisting of hydrogen, hydroxyl, alkyl, oxyalkyl, carboxyl, carbonyl and sulfhydroxyl wherein from 2 to 40% by weight of said block copolymer is poly(monovinylarene), the steps comprising heating the styrene and block polymer at a temperature below about 125° C. until about 10-40% of the arene is polymerized and thereafter completing the interpolymerization at temperatures between about 110° and 225° C.

5. A process according to claim 4 wherein the interpolymerization mixture includes in addition 1-15% by weight of an elastomer of the group consisting of homo polymerized conjugated dienes and random copolymers of styrene and conjugated dienes.

6. An interpolymer according to claim 1 wherein the vinylarene is styrene.

7. An interpolymer according to claim 1 wherein the vinylarene is styrene and the block copolymer has the structure polystyrene-polybutadiene-polystyrene 8. An interpolymer according to claim 1 wherein the vinylarene is styrene and the block copolymer has the structure polystyrene-polybutadiene

References Cited

UNITED STATES PATENTS

| 2,269,692 | 11/1954 | Amos et al. | 260—880 |
| 3,231,635 | 1/1966 | Holden et al. | 260—879 |
| 3,243,481 | 3/1966 | Ruffing et al. | 260—880 |
| 3,251,905 | 5/1966 | Zelinski | 260—879 |
| 3,264,374 | 8/1966 | Jones | 260—880 |
| 3,264,375 | 8/1966 | Jones | 260—880 |

FOREIGN PATENTS 852,823  11/1960  Great Britain.

MURRAY TILLMAN, Primary Examiner
K. E. KUFFNER, Assistant Examiner

U.S. Cl. X.R.
260—876